(12) United States Patent
Song et al.

(10) Patent No.: US 9,128,574 B2
(45) Date of Patent: Sep. 8, 2015

(54) TOUCH SCREEN PANEL

(71) Applicant: Dongbu HiTek Co., Ltd., Bucheon (KR)

(72) Inventors: Joon Song, Seoul (KR); Young Moon Sonn, Seoul (KR); Woon Hyung Heo, Asan (KR); Hyeon Su Kim, Seoul (KR); Hyun Song, Suwon (KR); Young Wook Kim, Seoul (KR); Won Cheol Hong, Seoul (KR)

(73) Assignee: Dongbu Hi Tek Co., Ltd., Bucheon-si (KR)

( * ) Notice: Subject to any disclaimer, the term of this patent is extended or adjusted under 35 U.S.C. 154(b) by 168 days.

(21) Appl. No.: 13/655,308

(22) Filed: Oct. 18, 2012

(65) Prior Publication Data

US 2013/0307793 A1    Nov. 21, 2013

(30) Foreign Application Priority Data

May 16, 2012  (KR) ........................ 10-2012-0051775

(51) Int. Cl.
*G06F 3/044* (2006.01)

(52) U.S. Cl.
CPC ..................................... *G06F 3/044* (2013.01)

(58) Field of Classification Search
USPC .................................................. 345/173, 174
See application file for complete search history.

(56) References Cited

U.S. PATENT DOCUMENTS

| | | | |
|---|---|---|---|
| 7,423,635 B2 | 9/2008 | Taylor et al. | |
| 7,821,274 B2 | 10/2010 | Philipp et al. | |
| 7,864,160 B2 * | 1/2011 | Geaghan et al. | 345/173 |
| 8,004,499 B2 * | 8/2011 | Geaghan et al. | 345/173 |
| 8,274,488 B2 | 9/2012 | Bae | |
| 2004/0017362 A1 | 1/2004 | Mulligan et al. | |
| 2009/0090694 A1 | 4/2009 | Hotelling et al. | |
| 2011/0157079 A1 | 6/2011 | Wu et al. | |
| 2012/0162096 A1 * | 6/2012 | Lin et al. | 345/173 |
| 2012/0169628 A1 * | 7/2012 | Kuo et al. | 345/173 |
| 2012/0227259 A1 * | 9/2012 | Badaye et al. | 29/846 |
| 2013/0088459 A1 * | 4/2013 | Yeh et al. | 345/174 |

FOREIGN PATENT DOCUMENTS

| | | |
|---|---|---|
| JP | 2010-198586 A | 9/2010 |
| KR | 10-2010-0054899 A | 5/2010 |

(Continued)

OTHER PUBLICATIONS

Wuzhong Yuan; Mutual Capacitance Sensing Device and Method for Manufacturing the Same; Abstract of KR 20110076188, Jul. 7, 2011; http://worldwide.espacenet.com/.

(Continued)

*Primary Examiner* — Jason Olson
*Assistant Examiner* — Krishna Neupane
(74) *Attorney, Agent, or Firm* — Andrew D. Fortney; Central California IP Group, P.C.

(57) ABSTRACT

Disclosed is a touch screen panel including a plurality of separate sensing electrodes, and a plurality of separate driving electrodes. Each of the sensing electrodes includes a main electrode and a plurality of expanded parts. Each of the expanded parts includes a sub-electrode extending from the main electrode and at least one expanded electrode extending from the sub-electrode. Each of the driving electrodes surrounds at least part of a corresponding one of the expanded parts.

19 Claims, 11 Drawing Sheets

(56) References Cited

FOREIGN PATENT DOCUMENTS

| KR | 10-2011-0070274 A | 6/2011 |
|---|---|---|
| KR | 10-2011-0076188 A | 7/2011 |

OTHER PUBLICATIONS

Kim Young Hoon; Input Device; Abstract of KR 20100054899; May 26, 2010; http://worldwide.espacenet.com/.

Park Shin Kwon; Touch Panel and Driving Method of Making the Same; Abstract of KR 20110070274; Jun. 24, 2011; http://worldwide.espacenet.com/.

Hiratsuka Kazuyuki; Input Device; Abstract of JP 2010-198586; Sep. 9, 2010; http://www19.ipdl.inpit.go.jp/.

Korean Office Action dated Aug. 28, 2013; Korean Patent Application No. 10-2012-0051775; 5 pages total; Korea Intellectual Property Office.

\* cited by examiner

TOUCH SCREEN PANEL

CROSS-REFERENCE TO RELATED APPLICATION

This application claims priority under 35 U.S.C. §119 to Korean Application No. 10-2012-0051775, filed in Korea on 16 May, 2012, which is hereby incorporated in its entirety by reference as if fully set forth herein.

TECHNICAL FIELD

Embodiments of the invention relate to a touch screen panel and a portable terminal including the same.

BACKGROUND

A touch screen type display module having a touch screen panel is preferred for its convenient use and refined design of conventional electronic appliances, such as ATM devices, or TVs, and for the input of a portable electronic device such as a mobile phone.

Such a touch screen type display module is able to process a specific function by figuring out a specific point of a character or a specific position touched by a user's finger or a touch pen, without auxiliary input means such as a keypad.

A capacitive touch screen may be categorized into a mutual capacitive touch screen and a self capacitive touch screen. In the mutual capacitive touch screen, capacitive change between a sensing electrode and a driving electrode is detected by touch to determine a touch point. Generally, the capacitive touch screen panel may have a structure configured of sensing electrodes arranged in a longitudinal direction and driving electrodes arranged in a horizontal direction which are sequentially multilayered in an up and down direction.

This "Background" section is provided for background information only. The statements in this "Background" are not an admission that the subject matter disclosed in this "Background" section constitutes prior art to the present disclosure, and no part of this "Background" section may be used as an admission that any part of this application, including this "Background" section, constitutes prior art to the present disclosure.

SUMMARY

Accordingly, embodiments of the present invention may provide a touch screen panel including an electrode pattern layer that is able to enhance sensing accuracy.

In one embodiment, a backlight unit includes a touch screen panel; a plurality of separate sensing electrodes; and a plurality of separate driving electrodes, wherein each of the sensing electrodes comprises a main electrode and a plurality of expanded parts, and each of the expanded parts comprises (i) a sub-electrode expanding or extending from the main electrode and (ii) at least one expanded electrode expanding or extending from the sub-electrode, and each of the driving electrodes surrounds at least part of a corresponding one of the expanded parts.

The plurality of the sensing electrodes and the plurality of the driving electrodes may be in or on a single layer.

The sub-electrodes of the expanded parts may be expanding or extending from different portions of the main electrode, respectively.

The at least one expanded electrode may include a first expanded electrode expanding or extending from the sub-electrode in a first direction; and a second expanded electrode expanding or extending from the sub-electrode in a second direction.

The sub-electrode may be perpendicular to the main electrode, and the at least one expanded electrode may be parallel to the main electrode.

The first expanded electrode and the second expanded electrode may be vertically symmetrical with respect to the sub-electrode. An angle formed by the first expanded electrode and the second expanded electrode may be larger than 0° and smaller than 90°.

Side surfaces of the driving electrode surrounding the sub-electrode and the expanded electrode may be the same distance from a nearest side surface of the sub-electrode and the expanded electrode.

The touch screen panel may further include a board on the plurality of the sensing electrodes and the plurality of the driving electrodes. The touch screen panel may further include an insulation layer under the plurality of the sensing electrodes and the plurality of the driving electrodes.

The main electrode may have a linear shape. In some embodiments, the main electrode may have a line shape having a plurality of bent portions, and the sub-electrode may be expanded or extend from at least one of the bent portions.

An angle between the main electrode and the sub-electrode may be identical to an angle between the expanded electrode and the sub-electrode.

Each of the expanded parts may include an upper expanded electrode expanding or extending from a predetermined portion of the sub-electrode between the main electrode and the expanded electrode in a first direction; and a lower expanded electrode expanding or extending from the predetermined portion of the sub-electrode in a second direction. The upper expanded electrode and the lower expanded electrode may be vertically symmetrical with respect to the sub-electrode. The touch screen panel may further include first wiring lines connected to each of the plurality of sensing electrodes; and second wiring lines connected to each of the plurality of driving electrodes.

At least one of the expanded parts may further include an auxiliary expanded electrode expanding or extending from the at least one expanded electrode. The auxiliary expanded electrode may be in the expanded part in a location farthest from the first wiring lines. The lengths of the auxiliary expanded electrodes may increase as the distance(s) between the auxiliary expanded parts and the first wiring lines increases.

The first wiring lines may be connected to corresponding ends of the sensing electrodes, and the second wiring lines may be connected to corresponding driving electrodes and expanded to other ends of the sensing electrodes.

The line widths of the second wiring lines may increase as the length of the second wiring lines connected to the driving electrodes increases.

The touch screen panel according to embodiments of the invention may enhance sensing accuracy and reduce response time and current consumption.

BRIEF DESCRIPTION OF THE DRAWINGS

Arrangements and embodiments of the invention may be described in detail with reference to the following drawings in which like reference numerals refer to like elements and wherein.

DETAILED DESCRIPTION

Figure 1:
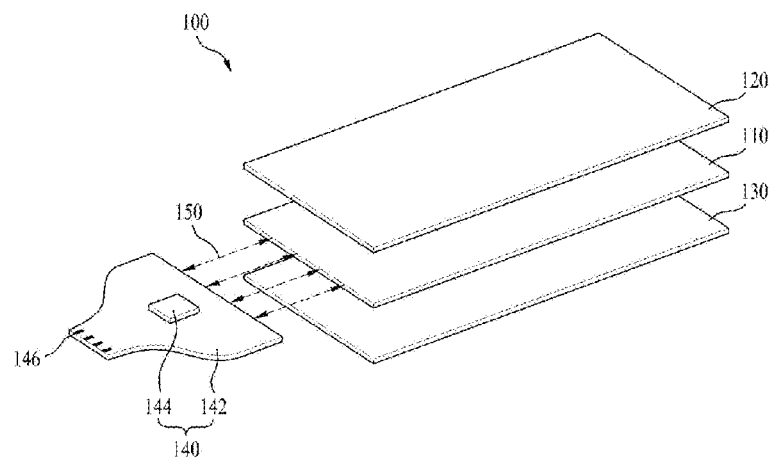
FIG. 1 is a perspective view illustrating a touch screen panel according to an embodiment.

Hereinafter, embodiments will be described with reference to the annexed drawings. It will be understood that when an element such as a layer (film), a region, a pattern or a structure is referred to as being 'on' or 'under' another element, it can be directly on/under the element, or one or more intervening elements may also be present. When an element is referred to as being 'on' or 'under', 'under the element' as well as 'on the element' can be included based on the element.

The sizes shown in the drawings are exaggerated, omitted or schematically illustrated for explanation convenience and accuracy. The size of each element may not fully reflect the actual size. Wherever possible, same reference numbers will be used throughout the drawings to refer to the same or like parts. A touch screen panel and a portable terminal including the same according to embodiments of the invention will be described in reference to the accompanying drawings as follows.

FIG. 1 is a perspective view illustrating a touch screen panel 100 according to one embodiment.

In reference to FIG. 1, the touch screen panel 100 includes an electrode pattern layer 110, a board 120, an insulation layer 130, a touch screen panel driving part 140 and wiring lines 150.

The electrode pattern layer 110 includes sensing electrodes and driving electrodes, separate (e.g., spaced apart) from each other, which are arranged in regions where touch is detected in a predetermined pattern, respectively.

The board 120 is disposed on a surface, for example, a front surface of the electrode pattern layer 110 and it may comprise a dielectric film having a high transmissivity. For example, the board 120 may include at least one of glass, polyethylene terephthalate (PET), polyethylene naphthalate (PEN), polyimide (PI) and poly(meth)acrylate. In this instance, the board 120 may be a touch screen cover.

The insulation layer 130 may be on the other surface, namely, a back surface of the electrode pattern layer 110, and it may comprise a transparent insulation layer such as PET. According to another embodiment, a closed layer (not shown) is disposed under the insulation layer 130, to remove electromagnetic inference (EMI) or noise that can be drawn to or affect the electrode pattern layer 110.

The touch screen panel driving part 140 may be electrically connected to the electrode pattern layer 130 by the wiring lines 150, and it may convert an electric signal into a coordinate signal. The touch screen panel driving part 140 includes a circuit board 142 and a panel controller 144 mounted on the circuit board 142. The circuit board 142 may comprise a flexible printed circuit (FPC) or chip on film (COF), and it may include a connector 146 as an electrical connection terminal. The panel controller 144 may detect a change in capacitive values of a specific point, when a specific point is touched on the touch screen 120, and it may generate a touch signal according to the coordinate(s) of the specific point computed based on the change in the capacitive values.

Figure 2:
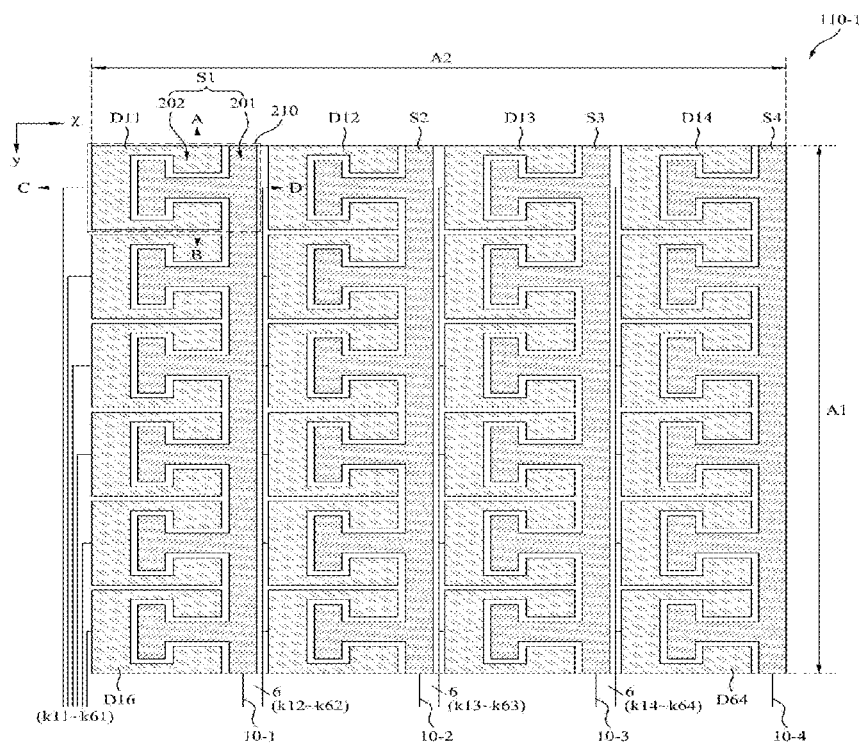
FIG. 2 is a diagram illustrating a first embodiment of an electrode pattern layer shown in FIG. 1.
Figure 3:
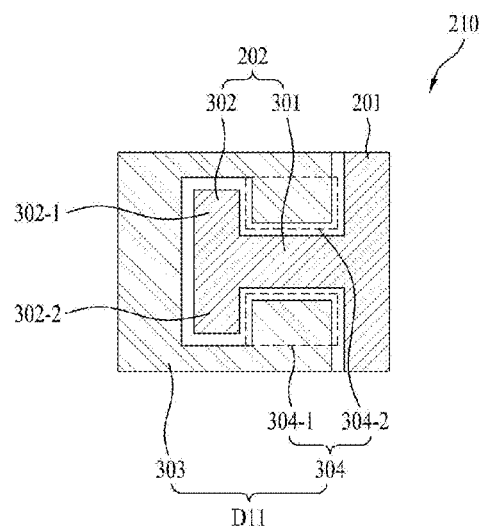
FIG. 3 is an enlarged view of a region defined by the dotted line of the electrode pattern layer shown in FIG. 2.
Figure 4A:
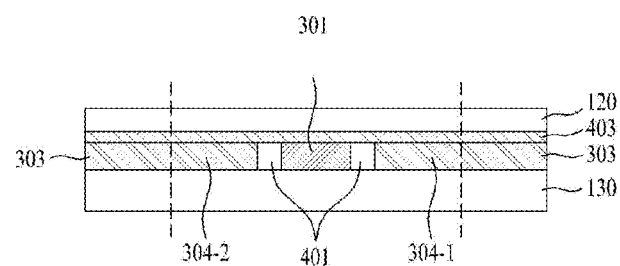
FIG. 4A is a cross-sectional view illustrating the dotted line region of the electrode pattern layer shown in FIG. 2, along the AB direction.
Figure 4B:
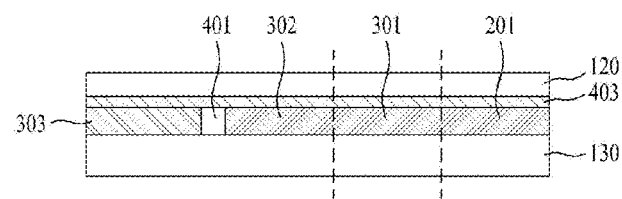
FIG. 4B is a cross-sectional view illustrating the dotted line region of the electrode pattern layer shown in FIG. 2, along the CD direction.

FIG. 2 illustrates a first embodiment (110-1) of the electrode pattern layer 110 shown in FIG. 1. FIG. 3 is an enlarged view of the electrode pattern layer outlined by dotted line (210) shown in FIG. 2. FIG. 4A is a cross-sectional view of the electrode pattern layer shown in FIG. 2, along the AB line. FIG. 4B is a cross-sectional view of the electrode pattern layer shown in FIG. 2, along the CD line. The board 120 and the insulation layer 130 shown in FIGS. 4A and 4B can be the same as those shown in FIG. 1.

In reference to FIGS. 2 and 3, the electrode pattern layer 110-1 includes driving electrodes D11 to Dmn (where m and n are each >1, and m and n are natural numbers) in a single layer, and sensing electrodes (S1 to Sn) that are arranged on or in a sensing region (A1×A2) of the board 120.

In this instance, the sensing region (A1×A2) may mean a region where touch is sensed. A1 is a first direction (for example, along a y-axis) and A2 may mean a second direction (for example, an x-axis direction). Also, the region defined by dotted line 210 in the electrode pattern layer 110-1 shown in FIG. 2 may be "a unit sensing region" configured to sense a change of capacitance.

The electrode pattern layer 110-1 may include a transmissive conductive material, for example, at least one of indium tin oxide (ITO), tin oxide (TO), indium zinc oxide (IZO), indium tin zinc oxide (ITZO), indium aluminum zinc oxide (IAZO), indium gallium zinc oxide (IGZO), indium gallium tin oxide (IGTO), aluminum zinc oxide (AZO), antimony tin oxide (ATO), gallium zinc oxide (GZO), carbon nano-tubes, conducting polymers, and silver or copper transparent ink.

An adhesive (403, see FIGS. 4A and 4B) may be disposed or deposited on the electrode pattern layer 110-1 and/or the board 120. One of the electrode pattern layer 110-1 or the board 120 may be adhered to the other by the adhesive 403.

The driving electrodes (D11 to Dmn, where m and n are >1, and m and n are natural numbers) are separate (e.g., spaced apart) from each other. The sensing electrodes (S1 to Sn) are also separate (e.g., spaced apart) from each other. Also, the sensing electrodes (S1 to Sn, where n>1 and n is a natural number) are separate (e.g., spaced apart) from the driving electrodes (D11 to Dmn, where m and n are each >1, and m and n are natural numbers).

The sensing electrodes (S1 to Sn) may be arranged in the second direction (for example, the x-axis direction in FIG. 2), and be separate or spaced apart from each other. Each of the sensing electrodes (S1 to Sn) may include a main electrode 201 and a plurality of expanded parts 202.

The main electrode 201 may have a linear shape (for example, formed longitudinally along the first [e.g., y-axis] direction). In other words, the length of the main electrode 201 along the first direction is larger than its width along the second direction (for example, the x-axis direction). For example, the main electrode 201 may have the shape of a line extended from a first end of the sensing region (A1×A2) to an opposite end thereof.

The main electrodes 201 of the sensing electrodes (S1 to Sn) are separate (spaced apart) from each other in the second direction (for example, the x-axis direction), in parallel.

Each of the expanded parts 202 may include a sub-electrode 301 expanding or extending from a different (e.g., unique) region of the main electrode 201 in the second direction (for example, the x-axis direction in FIG. 3) and at least one expanded electrode 302 expanding or extending from the sub-electrode 301 in the first direction (for example, the y-axis direction in FIG. 3).

The at least one expanded electrode 302 may be branched from the sub-electrode 301 in two different (e.g., opposite) directions. For example, the expanded electrode 302-2 and 302-2 may be symmetrical vertically with respect to the sub-electrode 301. For example, the at least one expanded electrode 302 may include a first expanded electrode 302-1 expanding or extending from the sub-electrode 301 in an upward direction (e.g., a first direction orthogonal to sub-electrode 301) and a second expanded electrode 302-2 expanding or extending from the sub-electrode 301 in a downward direction (e.g., a second direction orthogonal to sub-electrode 301 and opposite to the first orthogonal direction).

The sub-electrode 301 and the expanded electrode 302 may form one or more right angles. For example, the sub-electrode 301 may be perpendicular to the main electrode 201 and the expanded electrode 302 may be parallel to the main electrode 201. The expanded electrodes 302 of each expanded part 202 may be separate or spaced apart from each other, but part of the same unitary structure. For example, the expanded parts 202 may form a shape of an English letter "T", and they may be vertically symmetrical with respect to the sub-electrode 301.

The driving electrodes (D11 to Dmn, where m and n are each >1, and m and n are natural numbers) may be arranged on or in the sensing region (A1×A2) in a matrix having rows and columns, surrounding the main electrode 201 or between adjacent main electrodes 201.

The driving electrodes (D11 to Dmn, where m and n are each >1, and m and n are natural numbers) may be near the main electrode 201 and the expanded part 202. Each of the driving electrodes (D11 to Dmn, where m and n are each >1, and m and n are natural numbers) may be near and may surround at least three sides of a corresponding one of the expanded parts 202. For example, first driving electrodes (D11 to Dm1, where m>1, and m is a natural number) in a first column may surround a first sensing electrode (S1), and the first driving electrodes in a column of the array (D11 to Dm1 where m>1, and m is a natural number) surround corresponding expanded parts 202 of the first sensing electrode (S1), respectively, to form a vertical alignment. Each gap between a sensing electrode (for example, S1) and a neighboring driving electrode (for example, D11) may be uniform. Specifically, a side surface of the driving electrode (D11 to Dmn, where m and n are each >1, and m and n are natural numbers) near the sub-electrode 301 and the expanded electrode 302 may be separate (e.g., spaced apart) a uniform distance from a nearest side surface of the sub-electrode 301 and a nearest side surface of the expanded electrode 302.

Each of the driving electrodes (D11 to Dm1, where m>1, and m is a natural number) may include a first electrode 303 and a second electrode 304. The first electrode 303 may have a "U" shape located near the "T"-shaped expanded part 202 of the sensing electrode (for example, S1). The second electrode 304 may be connected to an end of the first electrode 303, and it may be located between the main electrode 201 and the expanded part 202 of the sensing electrode (for example, S1).

For example, the second electrode 304 may include a first part 304-1 expanding or extending from a first end of the first electrode 303 toward an area between the main electrode 201 and the expanded part 202 of the sensing electrode (for example, S1), and a second part 304-2 expanding or extending from an opposite end of the first electrode 303 to an area between the main electrode 201 and the expanded part 202.

In reference to FIGS. 4A and 4B, indium tin oxide (ITO) may be disposed or deposited on the insulation layer 130 and patterned to form the driving electrodes (D11 to Dmn, where m and n are each >1, and m and n are natural numbers) and the sensing electrodes (S1 to Sn). The driving electrodes (D11 to Dmn, where m and n are each >1, and m and n are natural numbers) and the sensing electrodes (S1 to Sn) may be adhered to the board 120 by the adhesive 403. The adhesive 403 may be an optically clear adhesive (OCA). An air gap 401 or a dielectric substance may be provided between the driving electrode (D11 to Dmn, where m and n are each >1, and m and n are natural numbers) and the sensing electrode (S1 to Sn).

The wiring lines 150 (FIG. 1) may include a group of first wiring lines 10-1 to 10-n (where n>1, and n is a natural number; see FIG. 2) connected to the sensing electrodes (S1 to Sn) and a group of second wiring lines K11 to Kmn (where m and n are each >1, and m and n are natural numbers) connected to the driving electrodes (D11 to Dmn, where m and n are each >1, and m and n are natural numbers).

For example, each of the first wiring lines 10-1 to 10-n (where n>1, and n is a natural number) may be connected to an end of a corresponding one of the sensing electrodes (S1 to Sn). In other words, one of the first wiring lines 10-1 to 10-n (where n>1 and n is a natural number) may be connected to an end of a corresponding one (for example, S1) of the sensing electrodes (S1 to Sn). The wiring lines 10-1 to 10-n (where n>1, and n is a natural number) may be independent lines separate from each other.

Each of the second wiring lines (K11 to Kmn, where m and n are each >1, and m and n are natural numbers) may be connected to a corresponding one of the driving electrodes (D11 to Dmn, where m and n are each >1, and m and n are natural numbers). In other words, one (for example, K11) of the second wiring lines (K11 to Kmn, where m and n are each >1, and m and n are natural numbers) may be connected to a corresponding one (D11) of the driving electrodes (D11 to Dmn, where m and n are each >1, and m and n are natural numbers). The second wiring lines (K11 to Kmn, where m and n are each >1, and m and n are natural numbers) may be independent lines separated from each other.

The group of first wiring lines 10-1 to 10-n (where n>1 and n is a natural number) and the group of second wiring lines (K11 to Kmn, where m and n are each >1, and m and n are natural numbers) may be connected to the driving part 140. The driving part 140 may supply electric power to the sensing electrodes (S1 to Sn, where n>1 and n is a natural number) and the driving electrodes (D11 to Dmn) via the first wiring lines 10-1 to 10-$n$ (where n>1 and n is a natural number) and the second wiring lines (K11 to Kmn, where m and n are each >1, and m and n are natural numbers).

When electric power is supplied to the sensing electrodes (S1 to Sn, where n>1 and n is a natural number) and the driving electrodes (D11 to Dmn, where m and n are each >1, and m and n are natural numbers), an electric field may be formed between the sensing electrodes (S1 to Sn, where n>1 and n is a natural number) and the driving electrodes (D11 to Dmn, where m and n are each >1, and m and n are natural numbers).

When the user's finger, stylus, or touch pen touches the board 120, an electric field between the sensing electrode and the driving electrode at the touch point is changed and a capacitance is changed accordingly. The change of the capacitance is sensed, and a position of the touch point may be calculated.

Generally, when the user's finger (or touch pen or stylus) is moved in a predetermined direction, an electrode pattern layer without rapid capacitance change is required to enhance sensing accuracy of the touch screen panel. In other words, if capacitance change is gentler as the structure of the electrode pattern layer becomes more symmetrical, the sensing accuracy of the touch screen panel can be improved.

According to one embodiment, when the user's finger, stylus or touch pen moves along the first direction (for example, the y-axis direction), the sensing accuracy may be enhanced by the sub-electrodes 301 of the sensing electrodes S1 to Sn. That is because the sub-electrodes 301 of the sensing electrodes (S1 to Sn) may be symmetrical, an advantageous structure or arrangement when the user's finger is moved along the first direction.

Also, according to a further embodiment, when the user's finger, touch pen, or stylus is moved along a second direction (for example, the x-axis direction), the sensing accuracy may be enhanced by the expanded electrodes 302 of the sensing electrodes (S1 to Sn). That is because the symmetrical expanded electrode 302 and main electrode 201 can reduce non-uniformity of the capacitance change when the user's finger is moved along the second direction (for example, the x-axis direction). Accordingly, embodiments of the invention may enhance the sensing accuracy of the touch screen panel by using the expanded electrodes 302.

Figure 5:
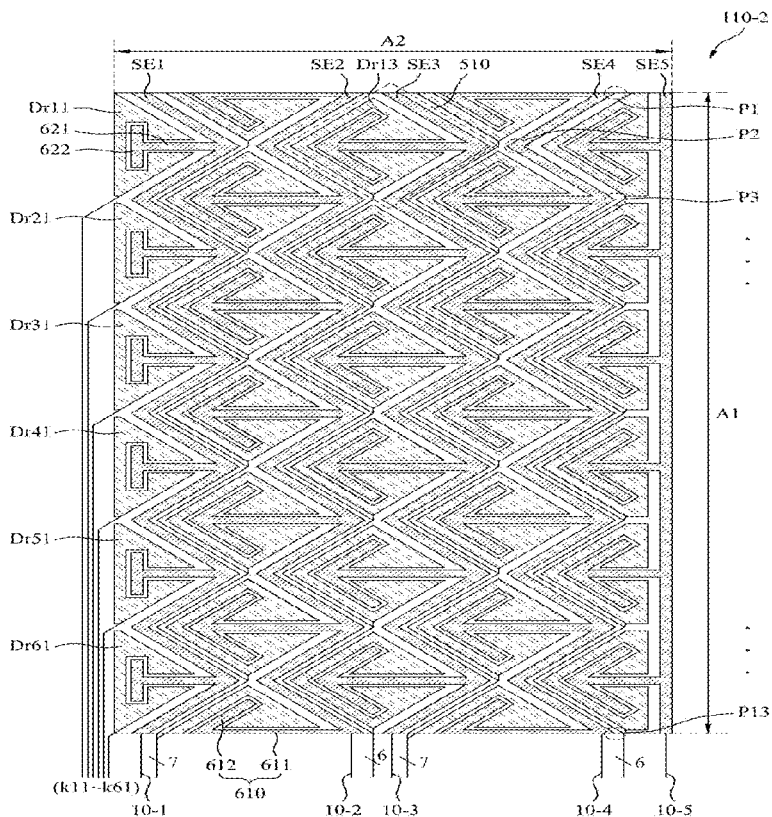
FIG. 5 is a diagram illustrating another embodiment of the electrode pattern layer.
Figure 6:
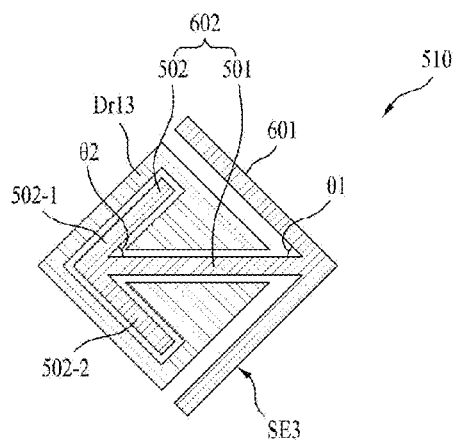
FIG. 6 is an enlarged view of a dotted line region of the electrode pattern layer shown in FIG. 5.

FIG. 5 is a diagram illustrating another embodiment 110-2 of the electrode pattern layer, and FIG. 6 is an enlarged view of a region defined by the dotted line 510 of the electrode pattern layer shown in FIG. 5.

In reference to FIGS. 5 and 6, the electrode pattern layer 110-2 may include sensing electrodes (SE1 to SEn, where n>1 and n is a natural number) that are on or in a sensing region (A1×A2) of the board 120 to form a single layer, and driving electrodes Dr11 to Drmn (where m and n are each >1, and m and n are natural numbers).

The sensing electrodes (SE1 to SEn, where n>1 and n is a natural number) are separate or spaced apart from each other. The driving electrodes (Dr11 to Drmn, where m and n are each >1, and m and n are natural numbers) are separate or spaced apart from each other. Also, the sensing electrodes (SE1 to SEn, where n>1 and n is a natural number) are separate or spaced apart from the driving electrodes (Dr11 to Drmn, where m and n are each >1, and m and n are natural numbers). Each of the sensing electrodes (SE1 to SEn, where n>1 and n is a natural number) may include a main electrode 601 and a plurality of expanded parts 602.

At least one main electrode 601 of the sensing electrodes (SE1 to SEn, where n>1 and n is a natural number) may be along a first, longitudinal direction (for example, the y-axis), with a shape of a line having bent portions (for example, P1 to Ph, where h>1 and h is a natural number). For example, the at least one main electrode 601 may have a meander shape, a zigzag curved shape, or a saw-like shape, with the plurality of the bent portions (P1 to Ph, for example, where h=13).

The length of the main electrode 601 along the first direction (for example, the y-axis direction) is larger than the total width of the main electrode 601 along the second direction (e.g., the x-axis direction). For example, the main electrode 601 may have a shape of a line having the bent portions (for example, P1 to Ph, for example, where h>1 and h is a natural number) extending from one end of the sensing region (A1×A2) to the opposite end thereof.

Each of the expanded parts 602 may include a sub-electrode 501 expanding or extending from at least one of the bent portions (for example, P1 to P13) along a second direction (for example, the x-axis direction) and at least one expanded electrode 502 expanding or extending from the sub-electrode 501 along a third direction.

The at least one expanded electrode 502 may include a first expanded electrode 502-1 and a second expanded electrode 502-2 that branch or extend from the sub-electrode 501 in different directions. The first expanded electrode 502-1 and the second expanded electrode 502-2 may be vertically symmetrical with respect to the sub-electrode 501.

The at least one sub-electrode 501 and the expanded electrode 502 may form an acute angle ($\theta 2$) that is larger than 0° and smaller than 90° (e.g., from about 30° to about 60°, and in one example, about 45°). Also, the main electrode 601 and the sub-electrode 501 may form an acute angle ($\theta 1$) that may be the same as $\theta 2$, but along an opposite direction of the first expanded electrode 501.

For example, the sub-electrode 501 may be expanded or extended from every odd-numbered (or even-numbered) bent portion (for example, P1, P3, P5, . . . P13) out of the bent portions (for example, P1 to Ph, for example, where h=13).

The angle ($\theta 1$) formed by the main electrode 601 and the sub-electrode 501 may be identical to the angle ($\theta 2$) formed by the sub-electrode 501 and the expanded electrode 502. $\theta 1 = \theta 2$ may enhance the symmetry between the main electrode 601 and the expanded part 602. Such symmetry enhancement may enable the embodiment(s) of FIGS. 5 and 6 to enhance the sensing accuracy of the touch screen panel.

The expanded part 602 adjacent to an edge of the sensing region (A1×A2) may include a sub-electrode 611 and an expanded electrode 612. The expanded electrode 612 may have a single branched electrode expanded in a single direction, to form an acute angle together with the sub-electrode 611. The first portion may face the edge of the sub-electrode 611. Also, an expanded electrode (for example, 622), adjacent to a different edge in the sensing region (A1×A2) may be perpendicular to the main electrode 621.

The main electrode (SE5) adjacent to another edge of the sensing region (A1×A2) may have a line shape that is longitudinal from the first portion (e.g., the adjacent edge) and that extends or expands toward an opposite edge of the sensing region (A1×A2).

Figure 7:
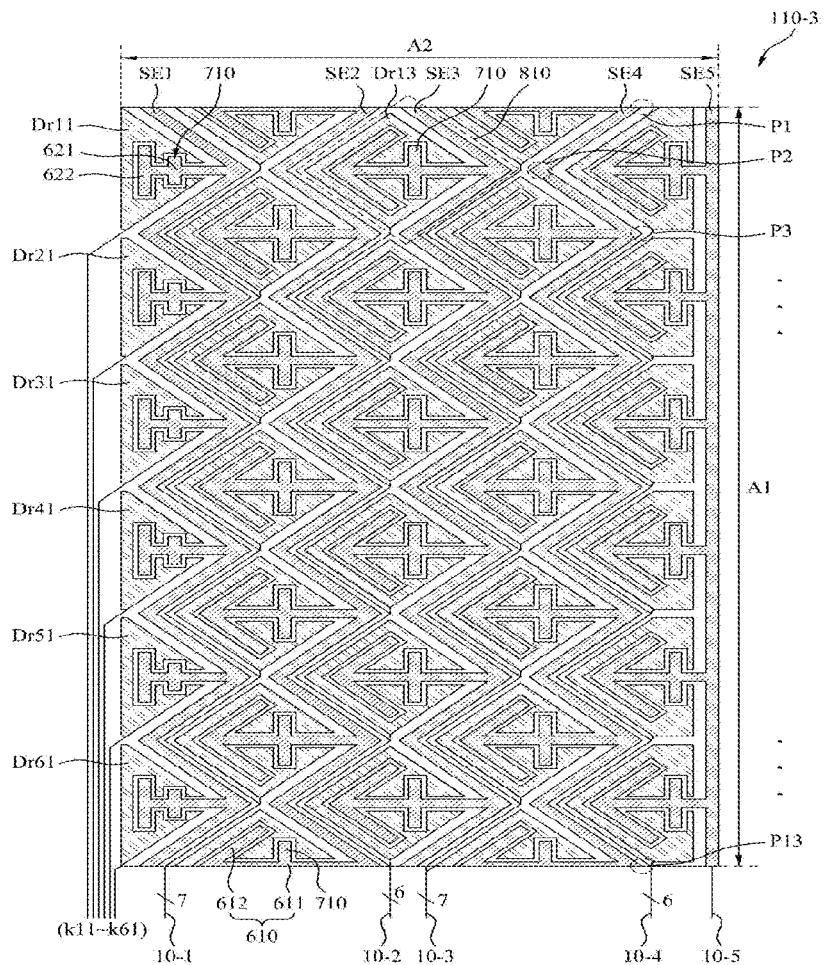
FIG. 7 is a diagram illustrating a further embodiment of the electrode pattern layer.
Figure 8:
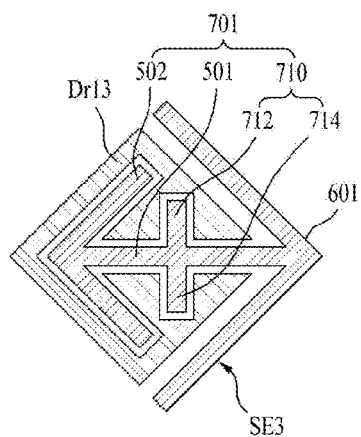
FIG. 8 is an enlarged view of a dotted line region of the electrode pattern layer shown in FIG. 7.

FIG. 7 is a diagram illustrating a further embodiment 110-3 of the electrode pattern layer, and FIG. 8 is an enlarged view of a region defined by the dotted line 810 of the electrode pattern layer 110-3 shown in FIG. 7. The electrode pattern layer 110-3 shown in FIG. 7 may be a variation of a previous embodiment.

In reference to FIGS. 7 and 8, an expanded part 701 according to a further embodiment 701 may have a structure that adds a third expanded electrode 710 to the expanded part 602. In other words, the expanded part 701 may include a first expanded electrode 501, a second expanded electrode 502 and a third expanded electrode 710.

The third expanded electrode 710 may expand or extend from a predetermined portion of the sub-electrode 501 between the main electrode 601 and the expanded electrode 502. For example, the third expanded electrode 710 may include a first (e.g., upper) expanded electrode 712 upwardly expanding or extending from a center of the sub-electrode 501 and a second (e.g., lower) expanded electrode 714 downwardly expanding or extending from the center of the sub-electrode 501. For example, the upper direction and the lower direction may be opposite to each other. The first expanded electrode 712 and the second expanded electrode 714 may be vertically symmetrical with respect to the sub-electrode 501. The first expanded electrode 712 and the second expanded electrode 714 may be perpendicular to the sub-electrode 501.

Figure 9:
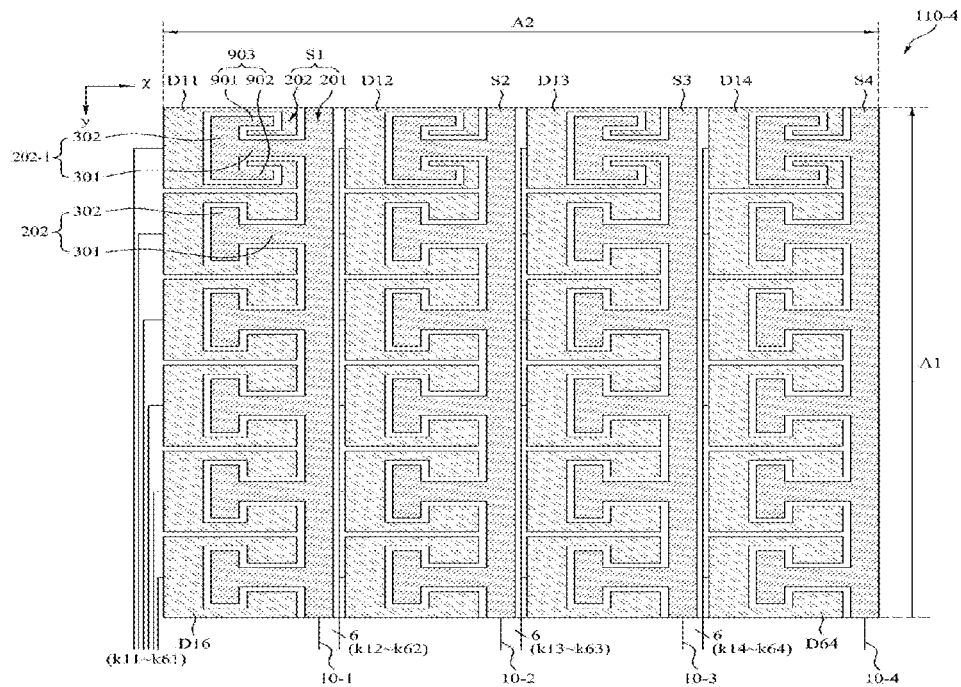
FIG. 9 is a diagram illustrating a still further embodiment of the electrode pattern layer.

FIG. 9 illustrates a still further embodiment 110-4 of the electrode pattern layer. The embodiment 110-4 may be a variation of one or more previous embodiments, and the same numeral references as those used with respect to FIG. 2 refer to the same elements. Thus, a repeated description will be omitted or explained briefly.

In reference to FIG. 9, each of the sensing electrodes (S1 to Sn, for example, where n=4) includes a main electrode 201 and expanded parts 202 and 202-1. At least one of the expanded parts 202 and 202-1 may include a sub-electrode 301, an expanded electrode 302 and an auxiliary expanded electrode 903. The auxiliary expanded electrode 903 may expand or extend from an end of the expanded electrode 302 in a fourth direction. In this instance, the still further embodiment may be the opposite of the previous embodiment mentioned above with respect to FIG. 5.

For example, the expanded parts 202-1 in a first row farthest in a first direction from the group of first wiring lines (10-1 to 10-n, for example, where n=4) may further include an auxiliary expanded electrode 903 expanding or extending from an end of the expanded electrode 302 in a fourth direction. For example, the auxiliary expanded electrode 903 may include a first auxiliary expanded electrode 901 expanding or extending from an end of the expanded electrode 302, and a second auxiliary expanded electrode 902 expanding or extending from the other end of the expanded electrode 302. The first auxiliary expanded electrode 901 and the second auxiliary expanded electrode 902 may be vertically symmetrical with respect to the sub-electrode 301.

The expanded parts 202 and 202-1 of the sensing electrodes (S1 to Sn, for example, where n=4) may have a resistance difference based on the distance from the first wiring lines (10-1 to 10-n, for example, where n=4). Accordingly, there may be a size difference of measurement signals received by the panel control part 144 of the touch screen panel 100.

According to the embodiment 110-4, the structure of the expanded part 202-1 farthest from the group of first wiring lines (10-1 to 10-n, for example, where n=4) is differentiated from the structure of the expanded part 202, such that a capacitance value between the driving electrode (D11 to D1n, for example, where n=4) farthest from the group of first wiring lines and the expanded part 202-1 may be controlled.

The capacitance values between the driving electrodes and the sensing electrodes can be adjusted based on their relative positions. The capacitance value adjusted based on the relative position may reduce the deviation of the measured signal size that may be generated by different resistance values according to the relative positions.

Accordingly, software computation can be decreased, and a response time of the touch screen panel 100 can be increased. Also, current consumption can be reduced. The response time may refer to the length of time from the instant of touch to the time taken to complete the computation of the coordinate of the touch point.

Figure 10:
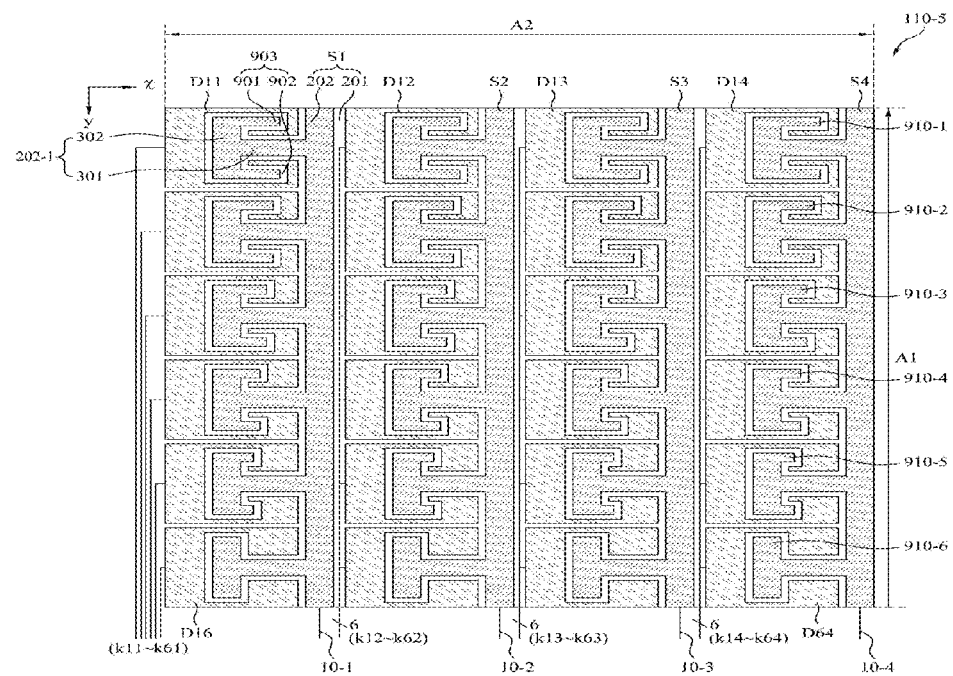
FIG. 10 is a diagram illustrating yet another embodiment of the electrode pattern layer.

FIG. 10 illustrates yet another embodiment 110-5 of the electrode pattern layer. The embodiment 110-5 may be another variation of previous embodiment(s). The same numeral references as FIG. 2 refer to the same elements, and a repeated description will be omitted or explained briefly.

In reference to FIG. 10, at least one of a plurality of expanded parts may include a sub-electrode 301, an expanded electrode 302, and an auxiliary expanded electrode 903.

The lengths of the auxiliary expanded electrodes 903 may be different from each other based on the distance between the first wiring lines 10-1 to 10-n (for example, where n=4) and the lengths of the expanded parts having the auxiliary expanded electrodes 903 may also be different from each other. For example, as the distances between the first wiring lines (10-1 to 10-n, for example, where n=4) increases, the lengths of the auxiliary expanded electrodes 903 provided in the expanded parts may also increase.

For example, as shown in FIG. 10, the expanded parts other than the ones closest to the first wiring lines (10-1 to 10-n, for example, where n=4) may further include auxiliary expanded electrodes 903, respectively, rather than the sub-electrodes 301 and the expanded electrodes 302, respectively. The length of the auxiliary expanded electrodes 903 may increase as the distance from the first wiring lines (10-1 to 10-n, for example, where n=4) increases. Compared with the embodiment of FIG. 9, the embodiment 110-4 can further reduce the capacitance difference according to the relative position.

Figure 11:
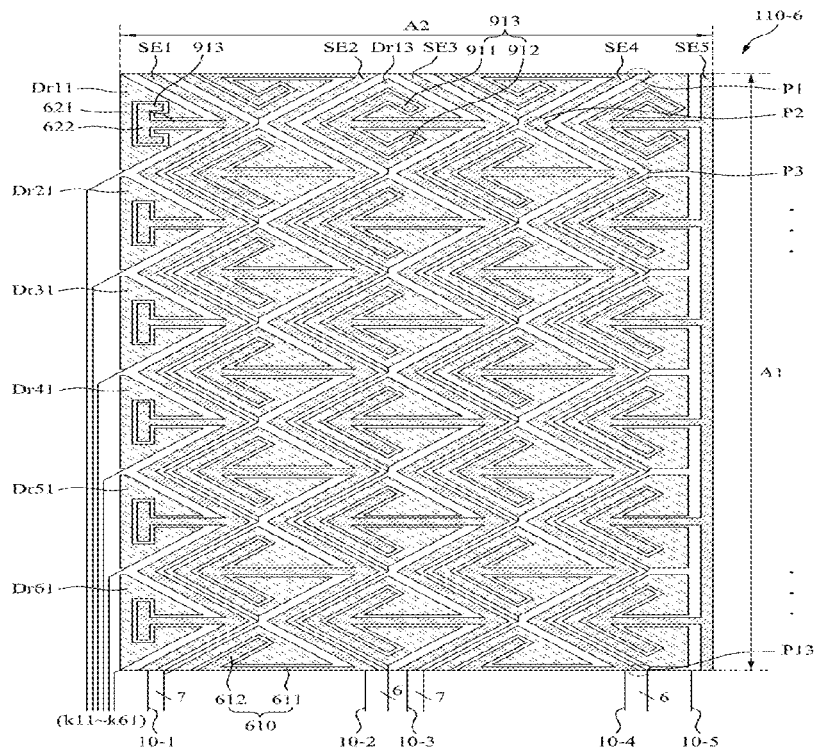
FIG. 11 is a diagram illustrating an even further embodiment of the electrode pattern layer.

FIG. 11 illustrates an even further embodiment 110-6 of the electrode pattern layer. The embodiment 110-6 may be a variation of one or more previous embodiments, such as embodiment 110-2 discussed above. The same numeral references as FIG. 5 refer to the same elements, and a repeated description will be omitted or explained briefly.

In reference to FIG. 11, the embodiment 110-6 may add an auxiliary expanded electrode 913 to the structure of the embodiment 110-2 discussed above. For example, expanded parts 202-1 shown in FIG. 9 in a first row farthest from the group of first wiring lines (10-1 to 10-n, for example, where n=4) in a first direction may further include an auxiliary expanded electrode 913 expanding or extending from an end of the expanded electrode 502 shown in FIG. 6 in a different (e.g., fourth) direction.

Figure 12:
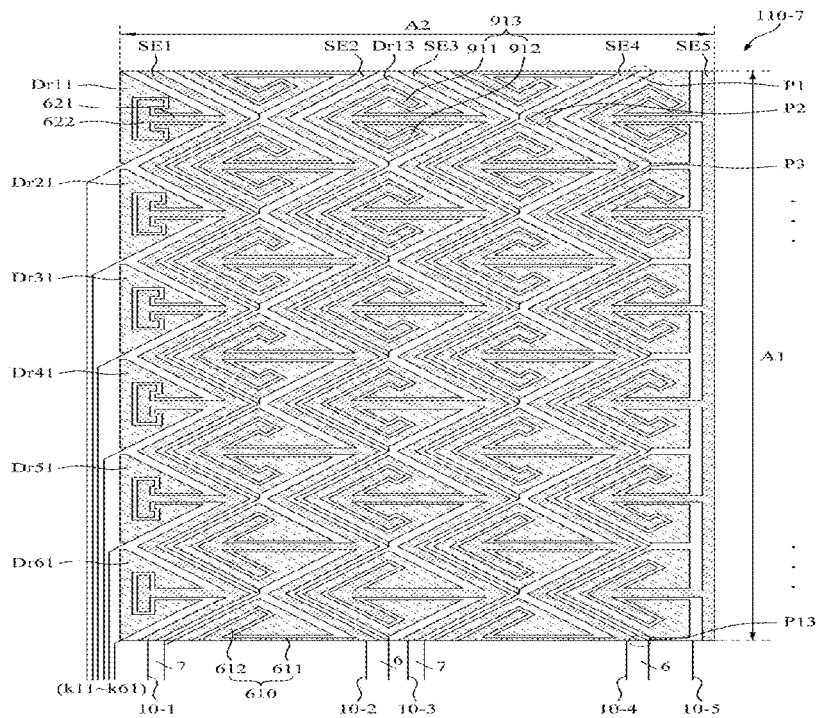
FIG. 12 is a diagram illustrating an additional further embodiment of the electrode pattern layer.

FIG. 12 illustrates an additional further embodiment 110-7 of the electrode pattern layer, and the embodiment 110-7 may be another variation of one or more previous embodiments, such as embodiment 110-2 discussed above. The same numeral references as FIG. 5 refer to the same elements, and a repeated description will be omitted or explained briefly.

In reference to FIG. 12, the lengths of the auxiliary expanded electrodes 913 may be differentiated from each other based on the distance between the first wiring lines (10-1 to 10-n, for example, where n=4). For example, as the distance increases between the expanded parts having the auxiliary expanded electrodes 913 and the first wiring lines (10-1 to 10-*n*, for example, where n=4), the lengths of the expanded electrodes may also increase.

Figure 13:
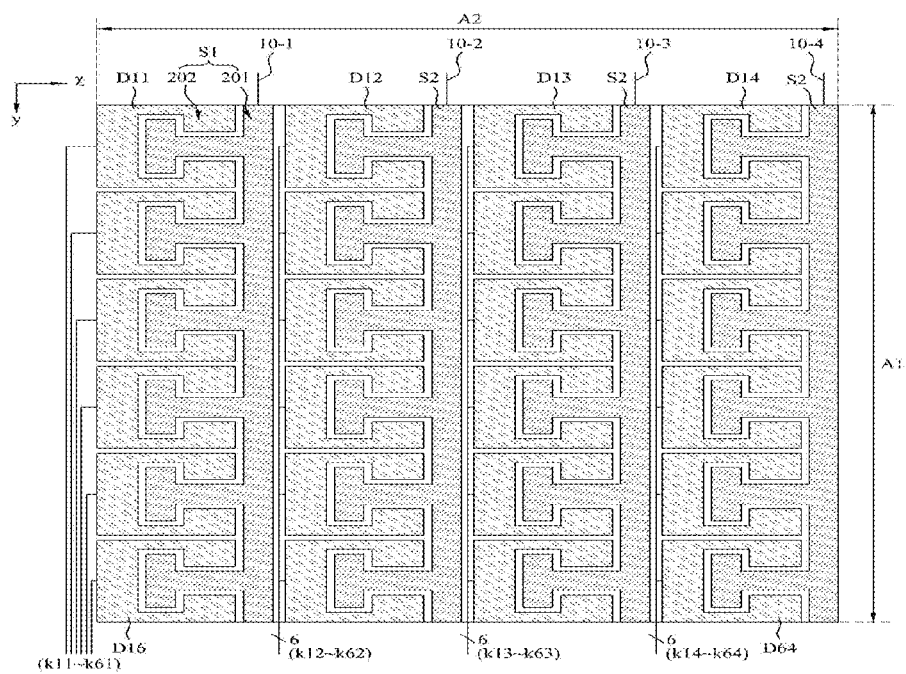
FIG. 13 is a diagram illustrating a connection between the electrode pattern layer shown in FIG. 1 and wiring lines.

FIG. 13 illustrates an exemplary connection between the electrode pattern layer 110 and the wiring lines (10-1 to 10-*n* and K11 to K64).

In reference to FIG. 13, the first wiring lines (10-1 to 10-*n*, for example, where n=4) may be connected to ends of the sensing electrodes (S1 to Sn, for example, where n=4). The second wiring lines (K11 to Kmn, for example, where m=6 and n=4) may be connected to the driving electrodes (D11 to Dmn, for example, where m=6 and n=4). The second wiring lines may expand or extend toward the other ends of the sensing electrodes (S1 to Sn, for example, where n=4).

For example, each of the first wiring lines (10-1 to 10-*n*, for example, where n=4) may be connected to an end of a main electrode 201 in a corresponding one of the sensing electrodes (S1 to Sn, for example, where n=4), and may expand or extend toward the opposite end of the main electrode 201. In other words, the first wiring lines (10-1 to 10-*n*, for example, where n=4) and the second wiring lines (K11 to Kmn, for example, where m=6 and n=4) may expand or extend in different directions with respect to the sensing region (A1× A2). In other words, the first wiring lines (10-1 to 10-*n*, for example, where n=4) and the second wiring lines (K11 to Kmn, for example, where m=6 and n=4) have different directions with respect to a particular location or structure in, or border of, the sensing region (A1×A2), to reduce a path length difference of each signal. In this instance, a signal path may refer to a path passing the second wiring lines (K11 to Kmn, for example, where m=6 and n=4), the driving electrodes (D11 to Dmn, for example, where m=6 and n=4), the sensing electrodes (S1 to Sn, for example, where n=4), and the first wiring lines (10-1 to 10-*n*, for example, where n=4).

Figure 14:
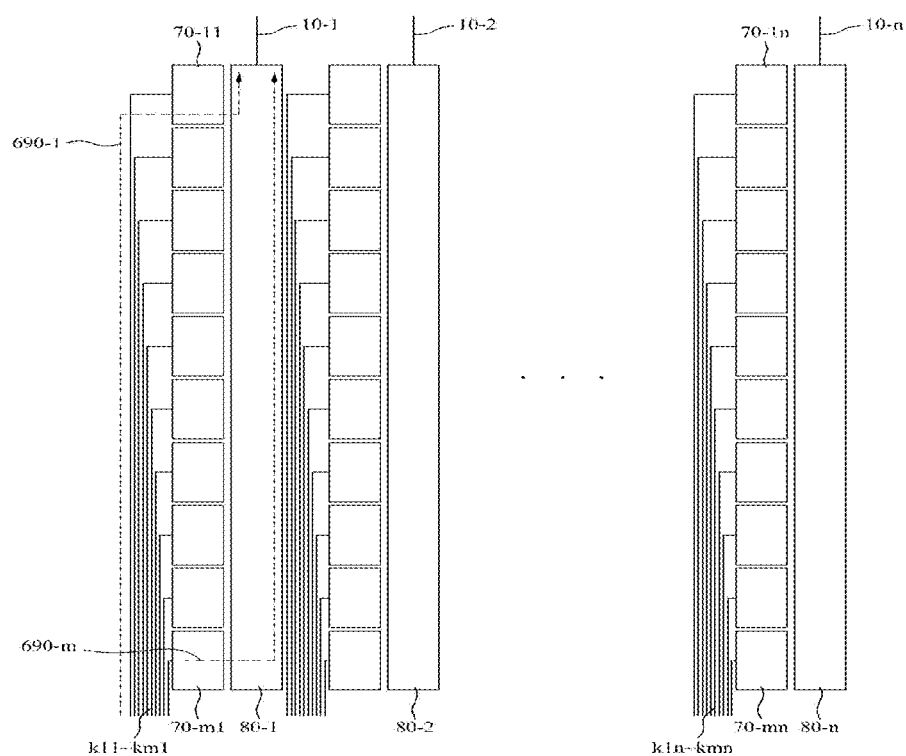
FIG. 14 is a diagram illustrating a first connection relationship between the electrode pattern layer shown in FIG. 1 and wiring lines.
Figure 15:
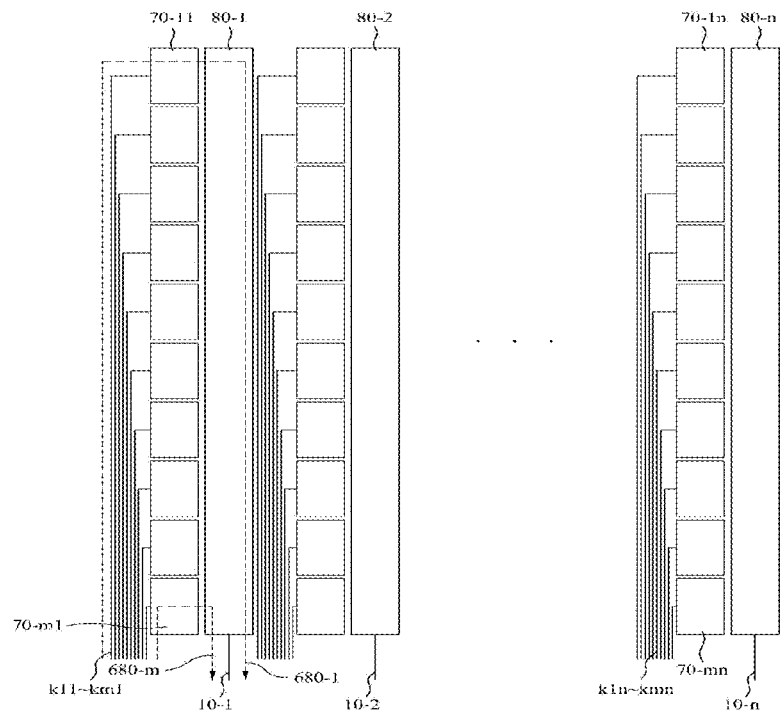
FIG. 15 is a diagram illustrating a second connection relationship between the electrode pattern layer shown in FIG. 1 and wiring lines.

FIG. 14 is a diagram illustrating a first connection relationship between the first wiring lines (10-1 to 10-*n*) and the second wiring lines (K11 to Kmn). FIG. 15 is a diagram illustrating a second connection relationship between the first wiring lines (10-1 to 10-*n*) and the second wiring lines (K11 to Kmn).

In reference to FIGS. 14 and 15, the first connection relationship shows that the first wiring lines (10-1 to 10-*n*) and the second wiring lines (K11 to Kmn) extend or expand in different directions (e.g., to opposite ends of the sensing electrodes 80-1 to 80-*n*), as shown in and as discussed above with respect to FIG. 13. The second connection relationship of FIG. 15 shows that the first wiring lines (10-1 to 10-*n*) and the second wiring lines (K11 to Kmn) extend or expand in the same direction (e.g., to a same end of the sensing electrodes 80-1 to 80-*n*).

Signal paths (690-1 to 690-*m* and 680-1 to 680-*m*) in FIGS. 14 and 15 may refer to paths passing through the second wiring lines (K11 to Kmn, for example, where m=6 and n=4), the driving electrodes (70-11 to 70-*mn*, where m and n are each >1, and m and n are natural numbers), the sensing electrodes (80-1 to 80-*n*, where n>1 and n is a natural number), and the first wiring lines (10-1 to 10-*n*, for example, where n=4). In this instance, the driving electrodes (70-11 to 70-*mn*, where m and n are each >1, and m and n are natural numbers) and the sensing electrodes (80-1 to 80-*n*, where n>1 and n is a natural number) may be one of the embodiments 110-1 to 110-7 mentioned above.

The lengths of the signal paths 690-1 to 690-*m* (FIG. 14) are similar to each other. In contrast, there is a significant difference between the lengths of the first signal path 680-1 and the last signal path 680-*m* (FIG. 15). Accordingly, the difference between the lengths of the first signal paths 690-1 to 690-*m* may be smaller than the difference between the lengths of the second signal paths 680-1 to 680-*m*. In FIG. 14, the relatively small difference between the lengths of the signal paths and the decrease of the measured signal generated by the signal path may be relatively uniform. As a result, errors of the touch screen panel generated by the deviation of the signal path lengths can be reduced, and greater reliability can be achieved.

According to embodiments 110-4 to 110-7, the capacitance value may be adjusted by changing the structure of the expanded part, to make the size of the measured signal more uniform. However, the impedance changes according to the frequency of the measured signal, and the frequency range in which the signal size can be fitted (adjusted) may also be limited. However, according to the embodiment shown in FIG. 14, the deviation of the signal path lengths may be reduced, and the sizes of the measured signals can be relatively uniform with respect to the entire area of the sensing region (A1×A2), regardless of the frequency range.

As shown in FIG. 15, to reduce non-uniformities in the measured signal size as a result of the differences between the lengths of the second signal paths 680-1 to 680-*m*, the widths of the second wiring lines (K11 to Kmn) may be different from each other. In this instance, the widths of the second wiring lines (K11 to Kmn) may correspond to one or both of the horizontal length and the vertical length of the second wiring lines (K11 to Kmn). For example, the width of the shorter lines (e.g., Km1 to Kmn) is less than the width of the longer lines (e.g., K11 to K1*n*)

Based on the distance between driving electrodes 70-11 to 70-*mn* connected to the second wiring lines (K11 to Kmn) and the first wiring lines 10-1 to 10-*n*, the lengths and/or the line widths of the second wiring lines (K11 to Kmn) may be different from each other. For example, as the distance of the second wiring lines from the first wiring lines 10-1 to 10-*n* increases, the line widths of the second wiring lines may increase. For example, the line width of the second wiring line (K11) connected to the driving electrode (for example, 70-11) in the first row and the first column of the array may be larger than the line width of the second wiring line (Km1) connected to the driving electrode (for example, 70-*m*1) located in the mth row and the first column. As a result, in the embodiment shown in FIG. 15, the line widths of the second wiring lines connected to the driving electrodes in different rows X in the same column may be differentiated from each other, to adjust the resistance values of the second wiring lines and to reduce the difference in the sizes of the measured signals resulting from the differences in the signal path lengths.

Figure 16:
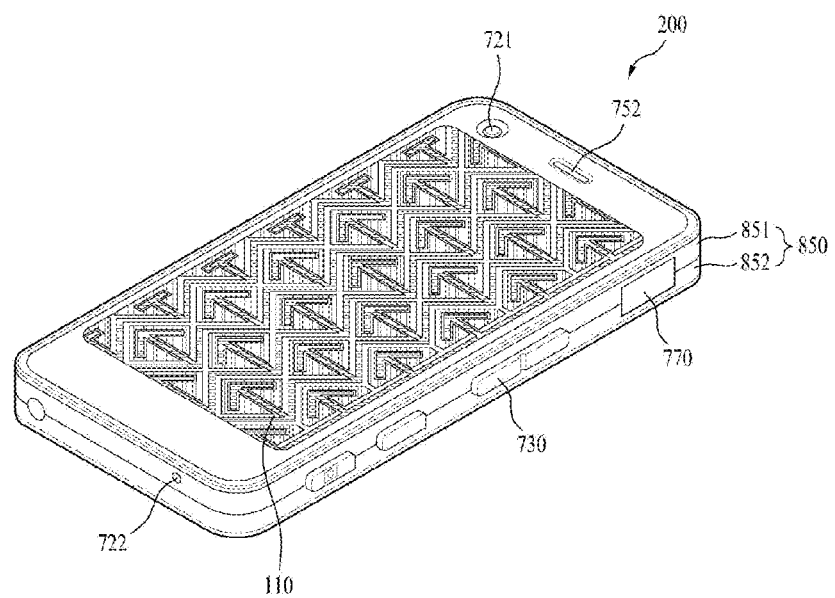
FIG. 16 is a perspective view illustrating a portable terminal including the touch screen panel according to an embodiment.
Figure 17:
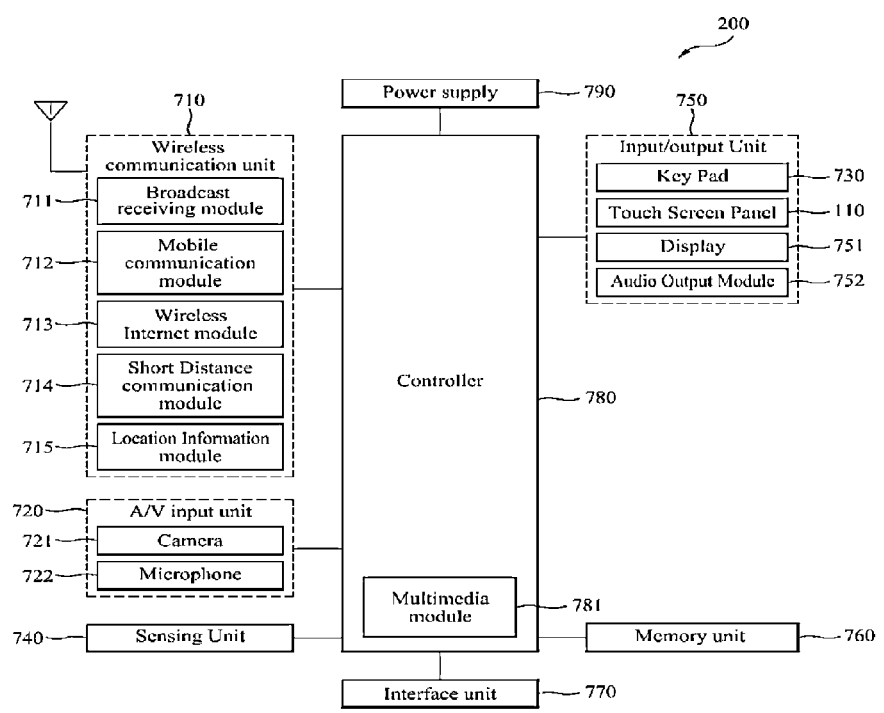
FIG. 17 is a diagram illustrating a structure of the portable terminal shown in FIG. 16.

FIG. 16 is a perspective view of a mobile terminal 200 including the touch screen panel 100, and FIG. 17 is a block diagram illustrating a structure of the mobile terminal 200 shown in FIG. 16.

In reference to FIGS. 16 and 17, a mobile terminal (200, hereinafter, "the terminal") includes a body 850, a wireless communication unit 710, an A/V input unit 720, a sensing unit 740, an input/output unit 750, a memory 760, an interface unit 770, a controller 780 and a power supply unit 790.

The body 850 shown in FIG. 16 is a bar type, and the shape of the body 850 is not limited thereto. The body 850 may be one of various types having sub-bodies coupled thereto to relatively move such as a slide type, a folder type, a swing type or a swirl type. The body 850 may include a case (such as a casing, a housing or a cover) that defines an exterior appearance of the terminal. For example, the body may be divided into a front case 851 and a rear case 852. Various electronic components of the terminal may be mounted in a predetermined space between the front case 851 and the rear case 852.

The wireless communication unit 710 may include at least one module that is able to enable wireless communication between the terminal 200 and a wireless communication system or between the terminal 200 and a network where the terminal 200 is located. For example, the wireless communication unit 710 may include a broadcasting receiving module 711, a mobile communication module 712, a wireless internet module 713, a short distance communication module 714 and a location information module 715.

The A/V (Audio/Video) input unit 720 is configured to input an audio signal and/or a video signal, and it may include a camera 721 and a microphone 722.

The sensing unit 740 detects a current state of the terminal 200, such as an open or closed state of the terminal 200, a location of the terminal 200, a user contact state, an azimuth of the terminal 200, acceleration/deceleration of the terminal 200, and it generates a sensing signal to control the operation of the terminal 200. For example, when the terminal 200 is a slide phone, the sensing unit 740 may sense an opening or closing of the slide phone. In addition, the sensing unit 740 may perform a sensing function related to a power supply of the power supply unit 790 and an external device connected to the interface unit 770.

The input/output unit 750 may generate input or output related to sight, hearing, or touch. The input/output unit 750 may generate input data for controlling the operation of the terminal 200. Also, it may display information processed in the terminal 200.

The input/output unit 750 may include a key pad 730, a touch screen panel 100, a display module 751 and a sound output port or audio output module 752. The key pad 730 may generate input data by keypad input. The touch screen panel 100 may convert a change in capacitance generated by the user's touch at a specific point of a touch screen into an electrical input signal. The touch screen panel 100 may be one of the embodiments described above.

The display module 751 may include a plurality of pixels having a color changing capability based on an electrical signal. For example, the display module 751 may include at least one of a liquid crystal display, a thin film transistor-liquid crystal display, an organic light-emitting diode, a flexible display and a 3D display.

The audio output module 752 may output audio data received from the wireless communication unit 710 in a call signal receiving mode, a speaking mode, a recording mode, a voice recognition mode, or a broadcasting receiving mode. Furthermore it may output audio data stored in the memory unit 760.

The memory unit 760 may store a program for processing and controlling of the control unit 780 therein, and/or it may temporarily store input/output data (for example, a telephone directory, a message, an audio, a still image, and/or a video) therein.

The interface unit 770 may be employed as a passage connected to an external device and to terminal 200. The interface unit 770 is supplied data by an external device or an electric power to transmit to each of the components in the terminal 200, and/or it can transmit internal data of the terminal 200 to the external device. For example, the interface unit 770 may include a wire/wireless headset port, an external charger port, a wire/wireless data port, a memory card port, a port connecting a device including an identification module, an audio input/output (I/O) port, a video I/O port and/or an earphone port.

The controller 780 may control an overall operation of the terminal 200. For example, the controller 780 may perform control and process functions related to voice communication, data communication and video phone calls. The controller 780 may include a panel controller 144 for the touch screen panel driving part 140 and/or it may perform the function of the panel controller 144.

The controller 780 may include a multimedia module 781 for playing multimedia. The multimedia module 781 may be located in or external to the controller 780. The controller 780 may also perform a pattern recognition process for recognizing a written input or a picture or drawing input performed on or provided to the touch screen as letters and/or images.

The power supply unit 790 may receive an external power or internal power applied thereto by control of the controller 780 to supply a power required by the operation of each of the components.

Figure 18:
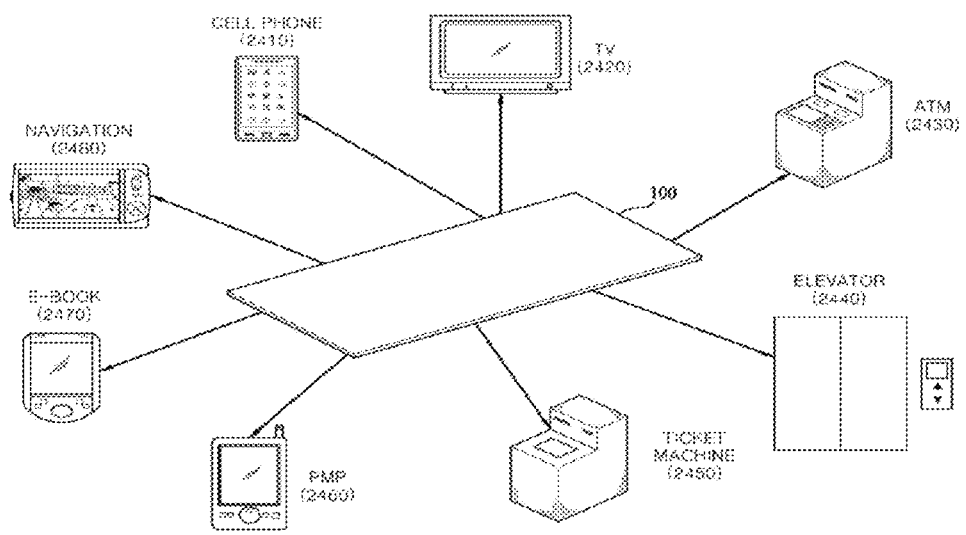
FIG. 18 is a diagram illustrating various embodiments of a method for mounting the touch screen panel shown in FIG. 1.

FIG. 18 illustrates various embodiments for using the touch screen panel 100. In reference to FIG. 18, a portable terminal 2410, a TV 2420, an ATM for a bank 2430, an elevator 2440, a ticket machine 2450, a portable media player (PMP) 2460, an E-book 2470 and a navigation system 2480 may include the touch screen panel 100.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen panel comprising:
   a plurality of first wiring lines;
   a plurality of second wiring lines;
   a plurality of separate sensing electrodes, each connected to a unique one of the plurality of first wiring lines; and
   a plurality of separate driving electrodes connected to the plurality of second wiring lines, in a same layer as the plurality of sensing electrodes;
   a board having high transmissivity on or adhered to the plurality of first wiring lines, the plurality of second wiring lines, the plurality of separate sensing electrodes, and the plurality of separate driving electrodes;
   wherein each of the sensing electrodes comprises a main electrode and a plurality of expanded parts,
   each of the expanded parts comprises a sub-electrode expanding or extending from the main electrode at a first angle of 90° or less, at least one expanded electrode expanding or extending from an end of the sub-electrode in a first direction at a second angle of 90° or less and in a second direction at said second angle, said second direction being different from said first direction and said expanded electrode having one end along said first direction and another end along said second direction, a first auxiliary expanded electrode expanding or extending from said one end of the expanded electrode, and a second auxiliary expanded electrode expanding or extending from the other end of the expanded electrode in a direction different from the at least one expanded electrode,
   lengths of the first and second auxiliary expanded electrodes increase as a distance from the plurality of first wiring lines increases, and
   each of the driving electrodes surrounds at least part of a corresponding one of the expanded parts.

2. The touch screen panel according to claim 1, wherein the sub-electrodes of the expanded parts extend from different portions of the main electrode, respectively.

3. The touch screen panel according to claim 1, wherein the at least one expanded electrode comprises:
   a first expanded electrode expanding or extending from the sub-electrode in the first direction; and
   a second expanded electrode expanding or extending from the sub-electrode in the second direction.

4. The touch screen panel according to claim 1, wherein the sub-electrode is perpendicular to the main electrode, and the at least one expanded electrode is parallel to the main electrode.

5. The touch screen panel according to claim 3, wherein the first expanded electrode and the second expanded electrode are vertically symmetrical with respect to the sub-electrode.

6. The touch screen panel according to claim 1, wherein side surfaces of the driving electrode surrounding the sub-electrode and the expanded electrode are an equal distance from nearest side surfaces of the sub-electrode and the expanded electrode.

7. The touch screen panel according to claim 1, further comprising:
   an insulation layer under the plurality of sensing electrodes and the plurality of driving electrodes.

8. The touch screen panel according to claim 1, wherein the main electrode has a linear shape.

9. The touch screen panel according to claim 1, wherein the main electrode has a line shape having a plurality of bent portions, and
   the sub-electrode extends from at least one of the bent portions.

10. The touch screen panel according to claim 1, wherein the first angle formed by the main electrode and the sub-electrode is identical to the second angle formed by the expanded electrode and the sub-electrode.

11. The touch screen panel according to claim 1, wherein each of the expanded parts further comprises:
   a first expanded electrode extending from a predetermined portion of the sub-electrode between the main electrode and the expanded electrode in the first direction; and
   a second expanded electrode extending from the predetermined portion of the sub-electrode in the second direction.

12. The touch screen panel according to claim 11, wherein the first expanded electrode and the second expanded electrode are vertically symmetrical with respect to the sub-electrode.

13. The touch screen panel according to claim 1, wherein each of the first and second auxiliary expanded electrodes are in a portion of the expanded part farthest from the first wiring lines.

14. The touch screen panel according to claim 1, wherein the first wiring lines are connected to corresponding first ends of the sensing electrodes, and
   the second wiring lines are connected to corresponding driving electrodes, and the second wiring lines expand or extend to corresponding second ends of the sensing electrodes, the second ends being different from the first ends.

15. The touch screen panel according to claim 1, wherein line widths of the second wiring lines increase as distances between the second wiring lines and the driving electrodes increase.

16. The touch screen panel according to claim 1, wherein each of the plurality of sensing electrodes further comprises a nearest sub-electrode expanding or extending from a corresponding main electrode, and at least one nearest expanded electrode expanding or extending front the nearest sub-electrode.

17. The touch screen panel according to claim 1, wherein the lengths of the first and second auxiliary expanded electrodes reduce a capacitance difference among the plurality of expanded parts according to the relative position along a corresponding main electrode.

18. The touch screen panel according to claim 1, further comprising a touch screen panel driving part comprising a circuit board and a panel controller that detects a change in capacitive values of a specific point when the specific point is touched on the touch screen, electrically connected to the sensing electrodes and driving electrodes.

19. The touch screen panel according to claim 18, wherein the first and second wiring lines extend in a same direction from the sensing electrodes and the driving electrode on the board without crossing.

* * * * *